United States Patent
Stricker et al.

(10) Patent No.: US 12,045,900 B1
(45) Date of Patent: *Jul. 23, 2024

(54) HOME ASSESSMENT

(71) Applicant: Allstate Insurance Company, Northbrook, IL (US)

(72) Inventors: Kurt M. Stricker, Northfield, IL (US); Beverly Landry-Gonzalez, Gurnee, IL (US); Nicolette de Guia, Chicago, IL (US); Mark E. Faga, Evanston, IL (US); Kelly Ann Brennan, Lake Zurich, IL (US); Robert H. Johnson, Hoffman Estates, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 543 days.

This patent is subject to a terminal disclaimer.

(21) Appl. No.: 17/099,228

(22) Filed: Nov. 16, 2020

Related U.S. Application Data

(63) Continuation of application No. 14/497,539, filed on Sep. 26, 2014, now Pat. No. 10,861,115.

(51) Int. Cl.
*G06Q 50/16* (2024.01)
*G06F 3/0484* (2022.01)

(52) U.S. Cl.
CPC .......... *G06Q 50/16* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 5,778,381 A * | 7/1998 | Sandifer | G06Q 10/06 707/999.107 |
| 6,766,322 B1 | 7/2004 | Bell | |
| 7,580,862 B1 | 8/2009 | Montelo et al. | |

(Continued)

FOREIGN PATENT DOCUMENTS

EP    1259921 A1    11/2002

OTHER PUBLICATIONS

Gandysoft, [online], available at: < https://web.archive.org/web/20180331200718/https://gandysoft.com/ >, archived on Mar. 31, 2018 (Year: 2018).*

(Continued)

*Primary Examiner* — Richard W. Crandall
(74) *Attorney, Agent, or Firm* — Polsinelli PC

(57) ABSTRACT

Systems, methods, apparatuses and computer-readable media for receiving data associated with a structure or home are presented. Data may be received from an insurance provider associated with the structure, from publicly available sources and/or from a user. A template of items to evaluate associated with the structure may be generated. User input may be received associated with one or more of the items and a determination may be made as to whether a potential issue exists with respect to the item. Other aspects relate to receiving data associated with a plurality of items from the template and prioritizing potential issues identified for each item. Other aspects relate to providing options or images to a user for selection. The user may select an option or image based on the similarity to the item in the structure, which may prompt additional options or images to be provided to the user for selection.

20 Claims, 9 Drawing Sheets

(56) References Cited

U.S. PATENT DOCUMENTS

| | | | |
|---|---|---|---|
| 7,698,213 B2 | 4/2010 | Lancaster | |
| 7,765,118 B1 | 7/2010 | Bohanek | |
| 7,809,587 B2 | 10/2010 | Dorai et al. | |
| 8,106,769 B1 | 1/2012 | Maroney et al. | |
| 8,229,767 B2 | 7/2012 | Birchall | |
| 8,229,769 B1 | 7/2012 | Hopkins, III | |
| 8,271,308 B2 | 9/2012 | Winkler | |
| 8,289,160 B1 | 10/2012 | Billman | |
| 8,346,578 B1 | 1/2013 | Hopkins et al. | |
| 8,423,548 B1 | 4/2013 | Trandal et al. | |
| 8,484,046 B1 | 7/2013 | Bauer et al. | |
| 8,510,147 B2 | 8/2013 | Mitra et al. | |
| 8,510,196 B1 | 8/2013 | Brandmaier et al. | |
| 8,515,788 B2 | 8/2013 | Tracy et al. | |
| 8,600,104 B2 | 12/2013 | Brown | |
| 8,650,106 B1 | 2/2014 | Hopkins, III | |
| 9,002,719 B2 | 4/2015 | Tofte | |
| 10,861,115 B1* | 12/2020 | Stricker | G06F 3/0484 |
| 2005/0071376 A1 | 3/2005 | Modi | |
| 2006/0253293 A1* | 11/2006 | Osborn | G06Q 30/0278 |
| | | | 705/306 |
| 2007/0203739 A1* | 8/2007 | Williams | G06Q 10/10 |
| | | | 434/308 |
| 2008/0030322 A1 | 2/2008 | Stauffer et al. | |
| 2008/0201161 A1 | 8/2008 | Kearns et al. | |
| 2008/0255862 A1 | 10/2008 | Bailey et al. | |
| 2008/0306799 A1 | 12/2008 | Sopko, III et al. | |
| 2009/0006185 A1 | 1/2009 | Stinson | |
| 2009/0024628 A1* | 1/2009 | Angel | G06Q 20/40 |
| | | | 707/999.009 |
| 2009/0138290 A1 | 5/2009 | Holden | |
| 2009/0171702 A1* | 7/2009 | Foster, Jr. | G06Q 10/06 |
| | | | 705/7.12 |
| 2009/0177500 A1 | 7/2009 | Swahn | |
| 2009/0265193 A1 | 10/2009 | Collins et al. | |
| 2010/0064235 A1 | 3/2010 | Walls | |
| 2011/0161119 A1 | 6/2011 | Collins | |
| 2012/0179431 A1 | 7/2012 | Labrie et al. | |
| 2012/0221371 A1 | 8/2012 | Hegazy et al. | |
| 2012/0297337 A1 | 11/2012 | St. Denis et al. | |
| 2012/0311053 A1 | 12/2012 | Labrie et al. | |
| 2013/0041841 A1 | 2/2013 | Lyons | |
| 2013/0096960 A1 | 4/2013 | English et al. | |
| 2013/0144658 A1 | 6/2013 | Schnabolk et al. | |
| 2013/0201018 A1 | 8/2013 | Horstemeyer et al. | |
| 2013/0226624 A1 | 8/2013 | Blessman et al. | |
| 2013/0253987 A1 | 9/2013 | Hamann | |
| 2013/0262029 A1 | 10/2013 | Pershing | |
| 2013/0262153 A1 | 10/2013 | Collins et al. | |
| 2013/0339065 A1 | 12/2013 | Denning et al. | |
| 2014/0019166 A1 | 1/2014 | Swanson et al. | |
| 2014/0279225 A1* | 9/2014 | Friedman | G06Q 30/0623 |
| | | | 705/26.35 |
| 2015/0025915 A1* | 1/2015 | Lekas | G06Q 40/08 |
| | | | 705/4 |
| 2015/0067018 A1* | 3/2015 | Connolly | G06Q 30/016 |
| | | | 709/202 |
| 2015/0088556 A1 | 3/2015 | Convery et al. | |
| 2015/0093047 A1 | 4/2015 | Battcher et al. | |
| 2015/0186953 A1* | 7/2015 | Gross | G06T 1/0007 |
| | | | 705/14.58 |
| 2015/0235322 A1 | 8/2015 | Emison | |
| 2015/0287152 A1 | 10/2015 | Oakes | |

OTHER PUBLICATIONS

"11 Wood-Flooring Problems and their Solutions", [print, accessible online], Fine Homebuilding, Peterson, Charles, Dec. 2008/Jan. 2009 accessible from <http://www.finehomebuilding.com/pdf>, the online version accessible from <http://www.finehomebuilding.com/2008/11/12/11-wood-flooring-problems-and-their-solutions>.

"Flood risk and insurance: A roadmap to 2013 and beyond" Final report of the flood insurance working groups, Dec. 2011, Department for Environment, Food and Rual Affairs.

"Real-Time Traffic Transmission Over the Internet", Furini and Towsley, Lecture Notes in Computer Science, Networking 20000: Broadband Communications, High Performance Networking, and Performance of Communication Networks, Springer Verlag, May 2000, pp. 483-494, Year: 2000.

"Real-Time", thefreedictionary.com, archived on Apr. 10, 2014, available at <https://web.archive.org/web/20140410000627/https://www.thefreedictionary.com/real-time>, Year 2014.

Jul. 25, 2017—(US) Final Office Action—U.S. Appl. No. 14/497,539.

Jun. 14, 2017—(US) Non-Final Office Action—U.S. Appl. No. 14/497,715.

Mar. 24, 2017—(US) Non-Final Office Action—U.S. Appl. No. 14/497,539.

Nov. 16, 2017—(US) Final Office Action—U.S. Appl. No. 14/497,715.

Nov. 30, 2017—(US) Non-Final Office Action—U.S. Appl. No. 14/497,539.

Aug. 24, 2018—(US) Final Office Action—U.S. Appl. No. 14/497,715.

Dec. 12, 2018—(US) Non-Final Office Action—U.S. Appl. No. 14/497,715.

Jun. 11, 2018—(US) Final Office Action—U.S. Appl. No. 14/497,539.

Mar. 22, 2018—(US) Non-Final Office Action—U.S. Appl. No. 14/497,715.

Sep. 28, 2018—(US) Non-Final Office Action—U.S. Appl. No. 14/497,539.

Apr. 5, 2019—(US) Final Office Action—U.S. Appl. No. 14/497,539.

Aug. 5, 2019—(US) Non-Final Office Acton—U.S. Appl. No. 14/497,539.

Jun. 10, 2019 (US) Notice of Allowance and Fees Due—U.S. Appl. No. 14/497,715.

Aug. 3, 2020—(US) Notice of Allowance—U.S. Appl. No. 14/497,539.

* cited by examiner

HOME ASSESSMENT

CROSS REFERENCE TO RELATED APPLICATION

The present application is continuation of and claims priority to co-pending U.S. application Ser. No. 14/497,539, filed Sep. 26, 2014, and entitled "Home Assessment," which is incorporated herein by reference in its entirety.

TECHNICAL FIELD

Aspects of the disclosure generally relate to evaluating systems in a home or structure. For instance, various aspects relate to generating a template to be used to conduct a home assessment.

BACKGROUND

A home or structure often includes various systems, structural features, appliances, etc. that, over the years, may require repair, replacement, or the like. Given that a person's home is often one of their most valuable assets, it is important to evaluation the condition of the home in general, as well as particular systems, structural features, appliances, or the like, in order to ensure that proper maintenance is being performed, issues are addressed early, and the like.

However, many homeowners are not familiar enough with the different systems, structural features or appliances to fully understand what should be evaluated, what to look for in an evaluation, and the like. Often, homeowners are not aware of a problem or issue until damage has been caused. This can be costly to the homeowner. Further, homeowners often may be aware of various issues in the home but may not fully understand the severity or potential damage that could be caused by the various issues and, thus, are unable to prioritize addressing the different issues.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein relate to systems, methods, apparatuses, and computer-readable media for receiving data associated with a structure or home. In some examples, data may be received from an insurance provider associated with the structure, from publicly available sources and/or from a user. In some arrangements, a template of items to evaluate associated with the structure may be generated. User input may be received associated with one or more of the items in the template and a determination may be made as to whether an issue or potential issue exists with respect to the item.

Other aspects relate to receiving data associated with a plurality of items from the template. A determination may be made as to whether an issue or potential issue exists with respect to the plurality of items and, if so, the issues or potential issues may be ranked in order to prioritize addressing the identified issues or potential issues.

Still other aspects relate to providing two or more options or images to a user for selection. The user may select an option or image based on the similarity to the item in the structure (e.g., select the option or image most applicable to the item being evaluated). Selection of an option or image may prompt additional options or images to be provided to the user for selection.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
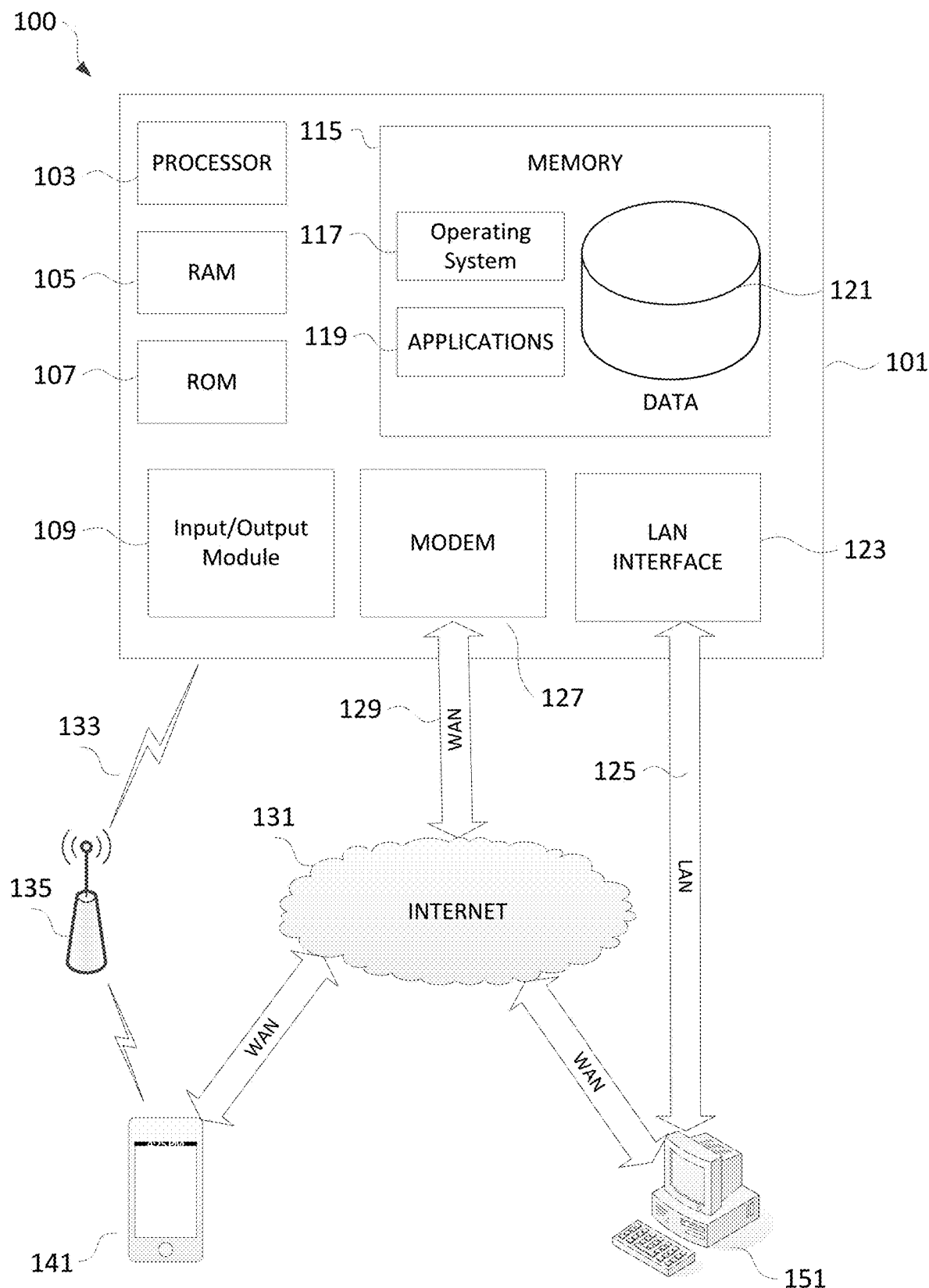
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to various servers or systems, such as a system or systems for evaluating or assessing one or more items associated with a home or structure, identifying one or more issues or potential issues associated with an item, creating a structure record to track issues associated with the structure and actions taken, and the like. Such systems may be configured as described herein for receiving data associated with a structure, receiving additional data associated with the locality or neighborhood of the structure, receiving data associated with one or more items associated with the structure, etc., to create a record of the structure and issues associated therewith, to identify issues that should be addressed and a priority for the identified issues, and/or to offer insurance incentives to address one or more issues.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive data associated with a structure, locality, neighborhood, one or more items associated with the structure, etc., create a structure record, identify issues to be addressed and/or a priority for addressing issues, and/or provide insurance rates and/or incentives based on the data.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, WiMAX, and wireless mesh networks, is presumed, and the various computing devices and system components described herein may be configured to communicate using any of these network protocols or technologies.

Additionally, one or more application programs 119 used by the system 101 may include computer-executable instructions (e.g., analysis of information received related to items in the template, identification of potential issues based on various data, etc.) for receiving data associated with a structure, locality, and/or one or more items associated with the structure, analyzing the data to evaluate potential issues, identify issues and/or prioritize issues, and/or generating insurance rates, adjustments, incentives, etc. based on the data.

The systems described herein may be used by an insurance company, financial institution or other entity to monitor and/or track activity associated with one or more structures. Although many examples herein will be described as being used in conjunction with an insurance company, the systems and methods described herein may be used by or with other entities or types of entities without departing from the invention. Further, although many examples discussed herein will be discussed in the context of a home (e.g., a home of a user), the systems, methods, arrangements, etc. described herein may be used to assess any structure or type of structure without departing from the invention.

Various structures, such as homes, include several systems, features, structural aspects, and the like, that should be assessed, at least periodically, to ensure that they are safe, secure and functioning as expected. However, often users associated with the structure, such as a homeowner, may be unsure of where to begin, what to look for in assessing the systems, or the like. Accordingly, various arrangements described herein include creating or generating a home or structure record to track various systems or aspects of the structure, issues that have occurred, recommended repairs, etc. The record may be generated initially based on information associated with the structure, such as age, type of building, etc. Additional information associated with the neighborhood or locality of the structure may also be used.

Based on this information, an assessment template may be generated. The assessment template may be a physical document, user interface, combination thereof, or the like, and may include a listing of each item being assessed or that is recommended for assessment/evaluation within the structure, as well as particular questions or requests for information about the status or condition of the item. In some examples, video or photographic images may be used or collected and stored in the record. The input received may be used to determine whether there are any issues or potential issues that should be addressed, priority of any issues that should be addressed, and the like. The home or structure record may store this information, as well as any action taken in response to the identified issues, to create a record of the structure that may be maintained through the life of the structure (e.g., passed from one owner or user to the next). These and various other arrangements will be discussed in more detail below.

Figure 2:
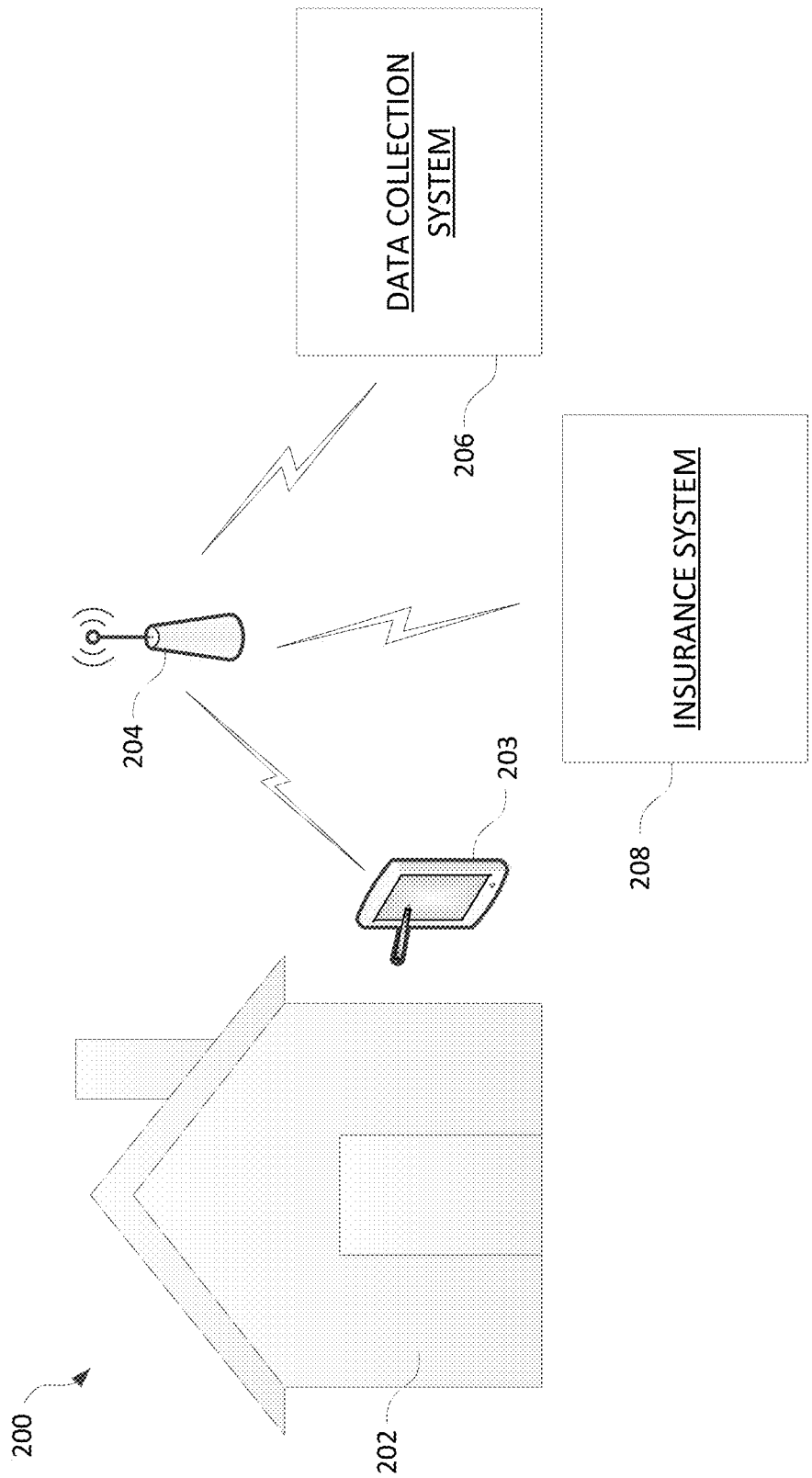
FIG. 2 is a schematic diagram of an example home assessment arrangement according to one or more aspects described herein.

In some arrangements, a system, such as a home assessment system, may be implemented by an entity. In some examples, the entity may be an insurance company. FIG. 2 is a schematic illustration of a home assessment system arrangement according to one or more aspects described herein. As shown in FIG. 2, the arrangement 200 may include a home or other structure 202. The home or structure 202 may generally include a variety of systems, features, items, etc. that should be evaluated to determine whether they may be in need of repair, replacement, might not be functioning at an optimal level, or the like. For instance, a home or other structure 202 may have one or more mechanical, electrical or plumbing systems that should be assessed to determine whether it is in need of repair or replacement, etc. For instance, the home or structure 202 may include a HVAC system, hot water heater, etc. Further, the home or structure may include various appliances, such as a washer, dryer, dishwasher, and the like. The home or structure 202 may further include various structural aspects that may be in need of repair or replacement, such as a roof, foundation, exterior finish (e.g., paint, brick, stone, etc.). Further still, the home or structure 202 may include additional structures, such as a garage, shed, and the like, that may also be included in an assessment.

In some examples, the various systems, features, etc. of the home may be assessed based on a template generated for the structure. For instance, information associated with the home may be collected and the system may generate a template identifying one or more items that for assessment or evaluation and requesting additional information about the one or more items in order to evaluate each item for an issue or potential issue. In some examples, this information may be collected via a computing device 203 associated with the structure 202 or a user associated with the structure. For instance, the template may be transmitted to a computing device 203 of the user and the user may provide information about the items being evaluated via the computing device 203.

This information may be transmitted to a data collection system 206. The data collection system 206 may be connected to or in communication with the home 202 (or a device 203 associated with the home). In some arrangements, information may be transmitted directly from the home 202 or device 203 associated with the home to the data collection system (or to the insurance system 208). In other arrangements, the information may be transmitted to a base unit 204 and then transmitted to the data collection system 206 (or insurance system 208).

The arrangement 200 may further include an entity, such as an insurance company, having a system 208 for further analyzing or processing the data. In some examples, the data received and associated with the home may be transmitted either from the data collection system 206 or directly from the home 202 or device 203 associated therewith. This arrangement permits data associated with the home to be collected and stored (e.g., at data collection system 206) without transmitting the data to the insurance company system 208, unless the user desires to transmit the data to the insurance company system 208. Accordingly, the user may choose to share the structure data with the insurance company or not. However, the insurance company may offer insurance discounts, rebates, incentives, etc. if the user shares the structure data with the insurance company, as will be discussed more fully below.

The arrangement 200 in FIG. 2 is merely a schematic example of one home assessment arrangement. The data transmissions may be made from various types of devices or systems without departing from the invention. Further, any data transmission may be made via wired or wireless connection and/or may be made to a base collection unit 204 directly or to a system 206, 208 directly (e.g., from the home 202 or device 203). The collected data may be used to assess various systems or features of the home or structure 202, to prioritize identified issues and/or provide incentives or discounts to users, and the like. Various uses of the collected data will be discussed more fully below.

Figure 3:
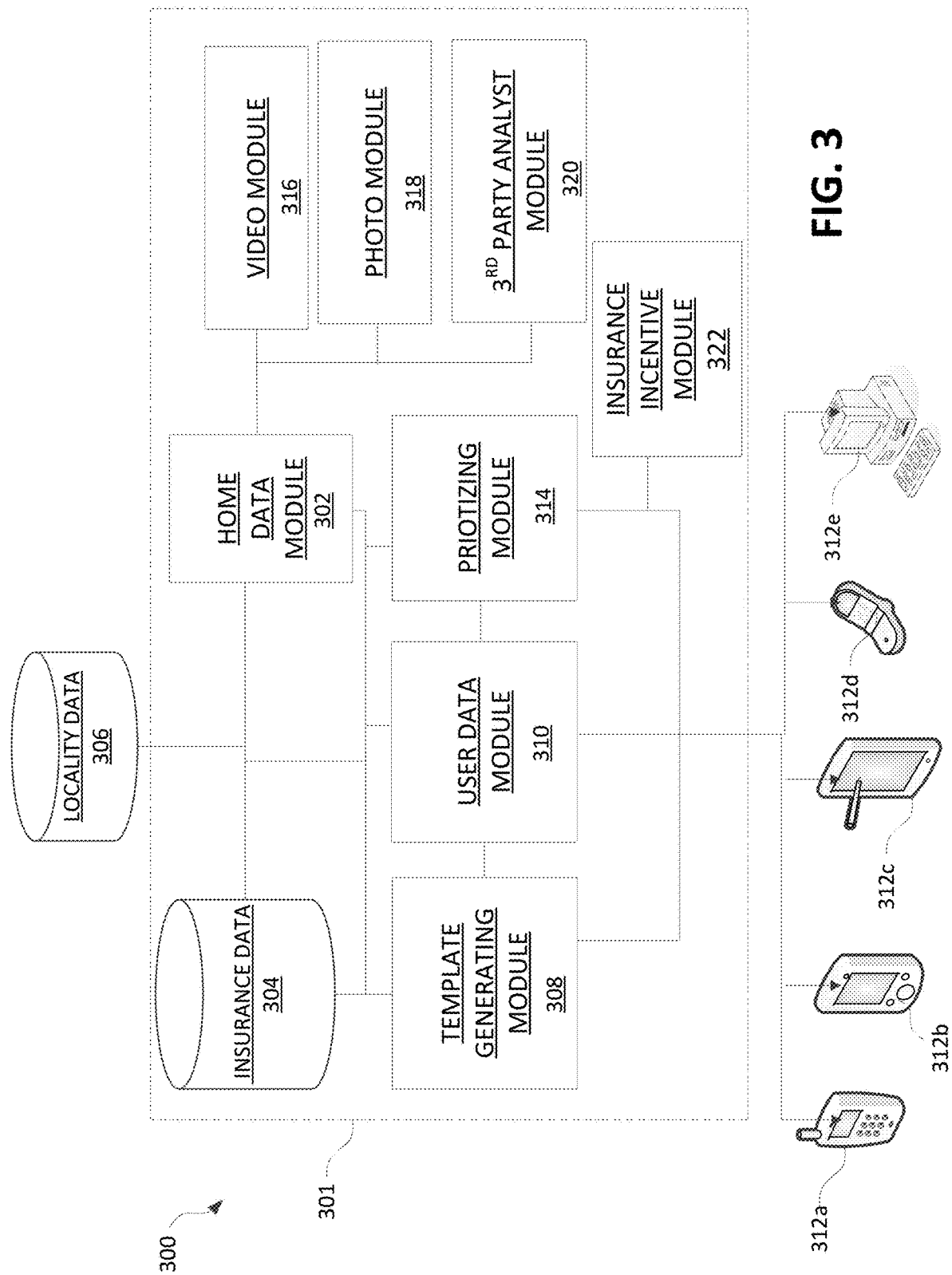
FIG. 3 is an example home assessment system according to one or more aspects described herein.

FIG. 3 illustrates one example home assessment system 300. Each component shown in FIG. 3 may be implemented in hardware, software or a combination of the two. Additionally, each component of the home assessment system may include a computing device (or system) having some or all of the structural components described above for computing device 101. In some arrangements, some or all of the components of system 300 may be housed in a single physical device. Alternatively, some or all of the components may be housed in separate physical devices.

The home assessment system 300 may be associated with an entity 301. For instance, the system 300 may be implemented by an entity 301, such as an insurance company. In other examples, the system 300 may be implemented by various other types of companies, universities, government entities, and the like. Several examples discussed herein will be described in the context of an insurance company. Further, one or more components of the system may be not associated with or external to the entity. For instance, one or more data stores may be a data store of publicly available information that is accessed by the system 300. These and other examples will be discussed more fully below.

The home assessment system 300 may include a plurality of modules. The modules may be implemented in hardware and/or software and may be configured to perform one or more functions within the system 300. For instance, the home assessment system 300 may include a home data module 302. The home data module may receive and/or store information associated with one or more structures or homes. For instance, the home data module 302 may store information such as the age of the home, location of the home, types of systems or structures within the home (e.g., type of roof, type of building materials used, etc.).

The home data module 302 may be connected to or in communication with insurance data store 304. The home data module 302 may receive data from the insurance data store 304 associated with the home or structure and/or the locality or neighborhood of the home or structure. For instance, data such as crime statistics, insurance claim data for a neighborhood or region, and the like, may be transmitted from the insurance data store 304 to the home data module 302. In some examples, the insurance data store 304 may also store information associated with the particular home, such as type and age of appliances that are insured, any recent insurance claims associated with the structure, and the like.

The home data module 302 may also be connected to or in communication with locality data store 306. As shown in FIG. 3, locality data store 306 may be external to or not associated with the entity 301 (e.g., an insurance provider) and, in some arrangements, may be publicly available information. In some examples, locality data store 306 may be internal to or associated with the entity 301 or may include multiple data stores, some of which are internal to the entity 301 and some of which are external to the entity 301.

Locality data store 306 may include information associated with cost of living in a locality, tax rates of the locality, crime statistics, historical weather data of the locality, and the like. The locality information for the location of the home or structure being assessed may be transmitted from the locality data store 306 to the home data module 302.

The home data module 302 may process the information associated with the home or structure and may generate a home or structure record associated with the home or structure. The home record may include a listing of systems, structural features, items, etc. associated with the home. The home record may be interactive such that information may be added to the home record (e.g., from one or more data stores, from a user, from a third party analyst evaluating the systems, and the like). The home record may track aspects of the home or structure, issues associated with the home or structure, as well as actions taken (e.g., repair, replacement, etc.) for the home or structure.

The home data module 302 may be connected to or in communication with template generating module 308. Template generating module 308 may generate a home assessment template for use in an assessment of the home and associated features. The template may include a listing of systems, structural features, appliances, or other items, etc. associated with the home that may be a potential issue and should be evaluated during the assessment. The template may be generated based on the home data received at the home data module 302 and may be based on the age of the structure, materials used in building the structure, and the like. That is, the template may be customized for the particular structure based on information gathered and associated with the structure. For instance, the template may be generated to include features specific to the structure (e.g., may be customized for the particular structure based on data received) and/or may be further customized, such as by a user, to include items specific to the structure (e.g., additional items, particular types of items or manufacturer information, etc.).

In some arrangements, the template may generate a listing of items for evaluation which may include roof, HVAC, hot water heater, sump pump, plumbing, electrical, washer, dryer, dishwasher, garage or other external structure, driveway condition, exterior structure, and the like. The template may be transmitted to a user for use in the assessment.

For example, the template may be transmitted to a user, such as a homeowner, who may be conducting the assessment. In other examples, the template may be transmitted to a third party analyst who is conducting the assessment. In still other examples, the template may be transmitted to both the user/homeowner, as well as the third party analyst, so that information can be shared between the parties involved in the assessment. For instance, the homeowner may conduct the assessment and transmit (in some examples in real-time or near real-time) video or photographic images of the various items being evaluated. Thus, the third party expert need not be present at the structure but may still receive visual information that may assist in conducting the assessment.

In some examples, the template may be transmitted in a hard copy document. In other examples, the template may be transmitted to the user electronically (e.g., via email). In still other examples, the template may be available to the user via an on-line application or an application associated with a computing device. For instance, the template may be accessible via the user's mobile device which may permit the user to directly enter information associated with each item being assessed, capture video or photographic images, etc., which may then be used to evaluate the items, update the home record and may be stored by the system.

For instance, the template may be transmitted to a computing device of a user, such as device 312a-312e. The user data module 310 may receive information from a user or individual providing information about the items being assessed (e.g., in response to questions or portions of the template). The information may be received from the one or more computing devices, 312a-312e. For instance, the user may access the template and/or provide information to the user data module 310 via a smartphone 312a, personal digital assistant (PDA) 312b, tablet computing device 312c, cell phone 312d or other computing device 312e.

The user data module 310 may analyze the information received and may, in some examples, identify additional information that may be required in order to further evaluate the item being assessed. For instance, based on information received associated with the item, the user data module 310 may generate requests for additional information that may be transmitted to the user. The requests may be in the form of questions or may include one or more images which the user may select if applicable. These and other aspects will be discussed more fully below.

Based on the data received from the user or assessor, as well as the data associated with the home and locality, the user data module 310 may determine or identify one or more issues or potential issues associated with the item being evaluated. For instance, the template may include questions regarding a roof of the home. One question may be "are the shingles peeling"? The user may respond "yes" which may prompt the user data module to request additional information. For instance, the user data module 310 may then transmit two or more images of roof shingles that are peeling—one image showing a shingle slightly peeling and one showing a roof with multiple shingles severely peeling. The user may be asked to identify the image more similar to the home being assessed. Based on this information, as well as the information such as age, type of materials, etc. obtained about the structure, the user data module 310 may identify whether there is a current issue with the roof or whether there is a potential issue that will arise within a predetermined amount of time (e.g., 1 year, 5 years, etc.).

The user data module 310 may be connected to or in communication with prioritizing module 314. Prioritizing module 314 may receive the analysis performed by the user data module 310 and, if multiple issues or potential issues are identified, may rank the issues and identify a priority recommending an order in which the issues should be addressed. For instance, if two issues are addressed, one of which is a roof with peeling shingles and one or which is a hot water heater that is past the age at which hot water heaters are replaced, the roof may be identified as the priority item. The ranking and priority may be determined based on a severity of the issue, as well as information associated with the age of the item being assessed, the likelihood of additional damage to other systems or structures that may occur if the issue is not addressed, etc. In some examples, insurance data may be used in the determination of the priority as well. For instance, if insurance data indicates that roofs in that particular locality tend to deteriorate faster than in other localities, even a small amount of visible damage on a roof may indicate an urgent need to replace or repair the roof. Accordingly, that information may be taken into account when prioritizing issues.

The home assessment system 300 may further include a video module 316 and/or a photo module 318. These modules 316, 318, may receive image data provided by a user or individual performing the assessment. For instance, if a user is conducting the assessment via an app on a mobile device, the user may capture video or photographic images or one or more systems. Those images may be transmitted to the system 300 and may be formatted, as needed. The images may be stored, added to the home record, and/or used by a third party analyst to further evaluate the item being assessed.

For instance, the image data may be transmitted to a third party analyst module 320. Additional information, such as the template generated by the template generating module 308 and user information received at user data module 310, may also be received by the third party analyst module 320 and may be evaluated. In some examples, a third party analyst may be evaluating the data in real-time or near real-time. For instance, as the user is conducting the assessment at the home or structure, the user may stream video images or transmit photographic images and respond to questions or inquiries in the template. The information may be transmitted to the third party analyst module 320 such that a third party analyst (e.g., an expert in home improvement, a plumber, roofer, electrician, etc.) may review the information as the item is being assessed. This may permit the expert to request additional information, e.g., via user data module 310.

The home assessment system 300 may further include an insurance rate or incentive module 322. The insurance rate or incentive module 322 may be configured to identify insurance rates, rebates, discounts or other incentives to provide to a user based on the results of an assessment. For instance, after one or more issues or potential issues are addressed by the system (e.g., the user data module 310), the insurance rate or incentive module 322 may identify an insurance rate, discount or incentive to offer to the user in order to encourage the user to address the identified issues. For instance, the insurance rate or incentive module 322 may identify a 5% rebate on a premium if a user addresses all items identified as potential issues within a predefined amount of time. Additionally or alternatively, the insurance rate or incentive module may identify a discount on a future premium if the user addressed any identified issues or potential issues according to the determined priority. Various other incentives, rate adjustments, discounts, and the like may be identified by the module 322 and transmitted to the user (e.g., to a computing device 312a-312e of the user).

In some examples, the home assessment system 300 may be connected to or in communication with one or more other systems. For instance, the home assessment system may be connected to or in communication with one or more contractor systems, home improvement store systems, etc. such that information collected during the assessment may be transmitted to the contract or home improvement store system. In some arrangements, a contractor may generate an estimate for the work based on the received assessment information and may transmit the estimate to the user for consideration.

Various aspects of the systems discussed above will be discussed more fully below.

Figure 4:
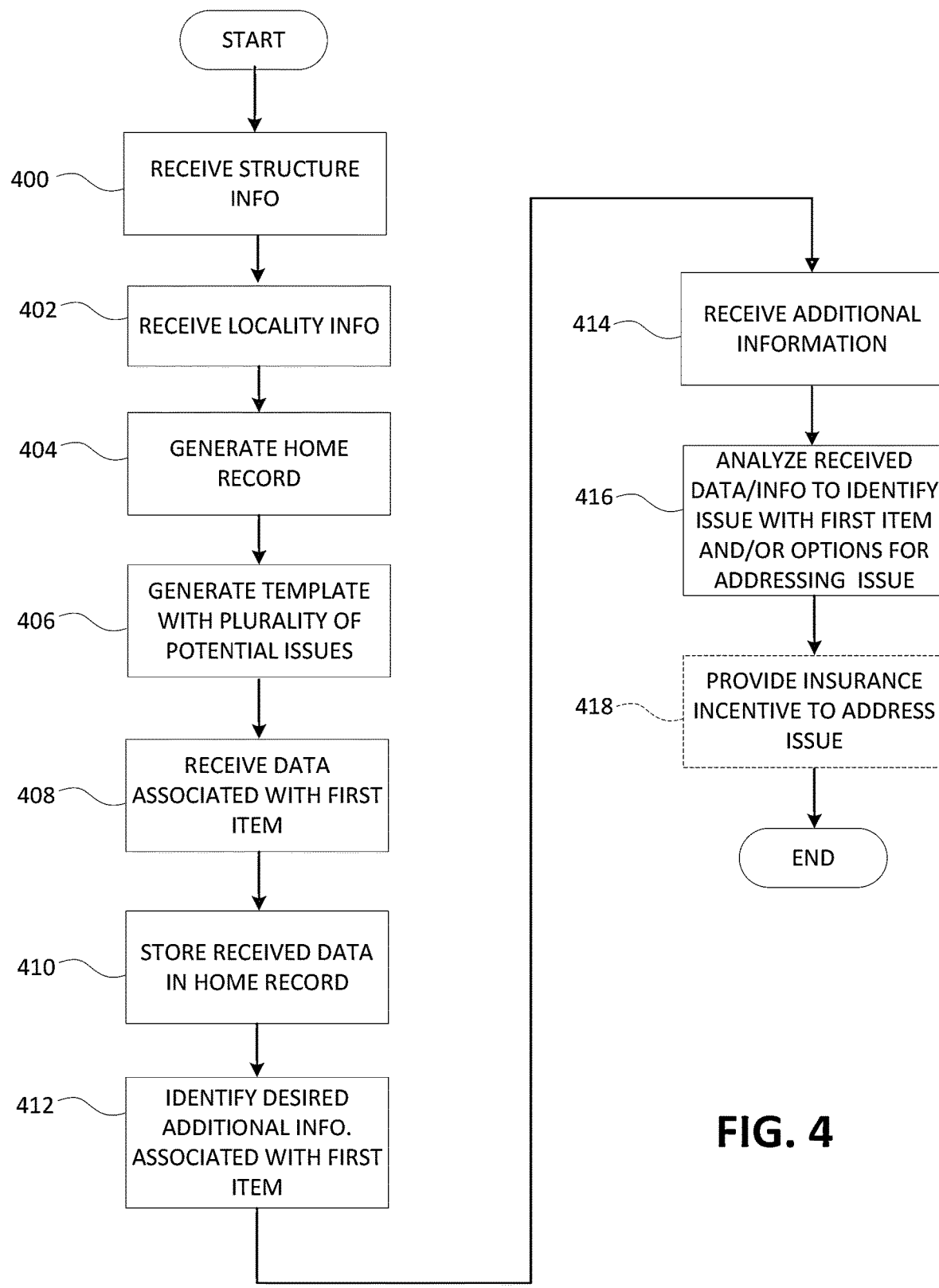
FIG. 4 is a flow chart illustrating one example method of evaluating a structure through a home or structure assessment according to one or more aspects described herein.

FIG. 4 illustrates one example method of conducting a home assessment according to one or more aspects described herein. In step 400, home or structure information is received. As discussed above, the home or structure information may include an age of the home, materials used in building the home, type of structure (e.g., single family residence, condominium, commercial structure, etc.), and the like. In some examples, the home or structure information may be received from a user (e.g., a homeowner) or from other sources, such as an insurance provider having information associated with the structure.

In step 402, locality information may be received. The locality information may include information such as cost of living, historical weather data, crime statistics, and the like. The locality information may include publicly available information and/or information held privately, such as by an insurance provider.

In step 404, a home record may be generated for the home or structure. The home record may be generated based on the home or structure information, as well as the locality information. The home record may be used to track the structure, issues associated with the structure, repairs or improvements made to the structure, etc. In some examples, the home record may be updated with additional information, such as information provided by a user in subsequent steps.

In step 406, a home assessment template may be generated. The home assessment template may include a listing of items for evaluation. The items being evaluated may be customized based on information known about the structure (e.g., from the received information, home record, etc.). Some example items for evaluation may include a roof, exterior structure, driveway condition, HVAC system, plumbing, electrical, appliances, and the like.

In step 408, data associated with a first item may be received. For instance, as discussed above, the template may be transmitted to a user who may be conducting an assessment of the home or structure. The template may be, in some examples, an online template accessed via a website (e.g., from a computing device of a user) or may be an application on a computing device of a user. Accordingly, the user may enter information directly into the template about the items being evaluated. For instance, a condition of one or more systems may be input by the user. The input may be selected from a pre-defined list of options (e.g., fair, good, excellent, etc.) and/or may be on a numeric scale (e.g., 1 to 10) indicating the condition of the item being evaluated.

The received data may be stored by the system in step 410. For instance, the received data may be input into the generated home record in order to update the home record and store the information associated with the structure.

In step 412, the received data may be processed and any additional information that would be useful in identifying potential issues with the item being evaluated may be identified. For instance, if the user indicates that the item being identified is in poor condition, the system may generate additional questions to transmit to the user requesting particular information about the item. In step 414, the identified additional information may be received.

In step 416, the received information and additional information may be analyzed to determine whether an issue or potential issue exists with the first item being evaluated. If any issue or potential issue exists, the system may further identify options for addressing the issue (e.g., repair, replacement, etc.). In some examples, the information may be transmitted to a contractor or home improvement store who may generate an estimate to address the issue.

In some examples, the information collected and the analysis performed on the first item might not be shared with an insurance provider. However, if information is shared with an insurance provider (e.g., the insurance provider implementing the system) one or more insurance incentives, rate adjustments, etc. may be identified in optional step 418. As discussed above, insurance incentives may include discounts, rebates, rate adjustments, etc. that may be offered to the user if the user address an identified issue with the first item.

The example method of FIG. 4 discusses evaluation of a first item. Additional items may be evaluating by repeating the process beginning at step 408, as desired.

Figure 5:
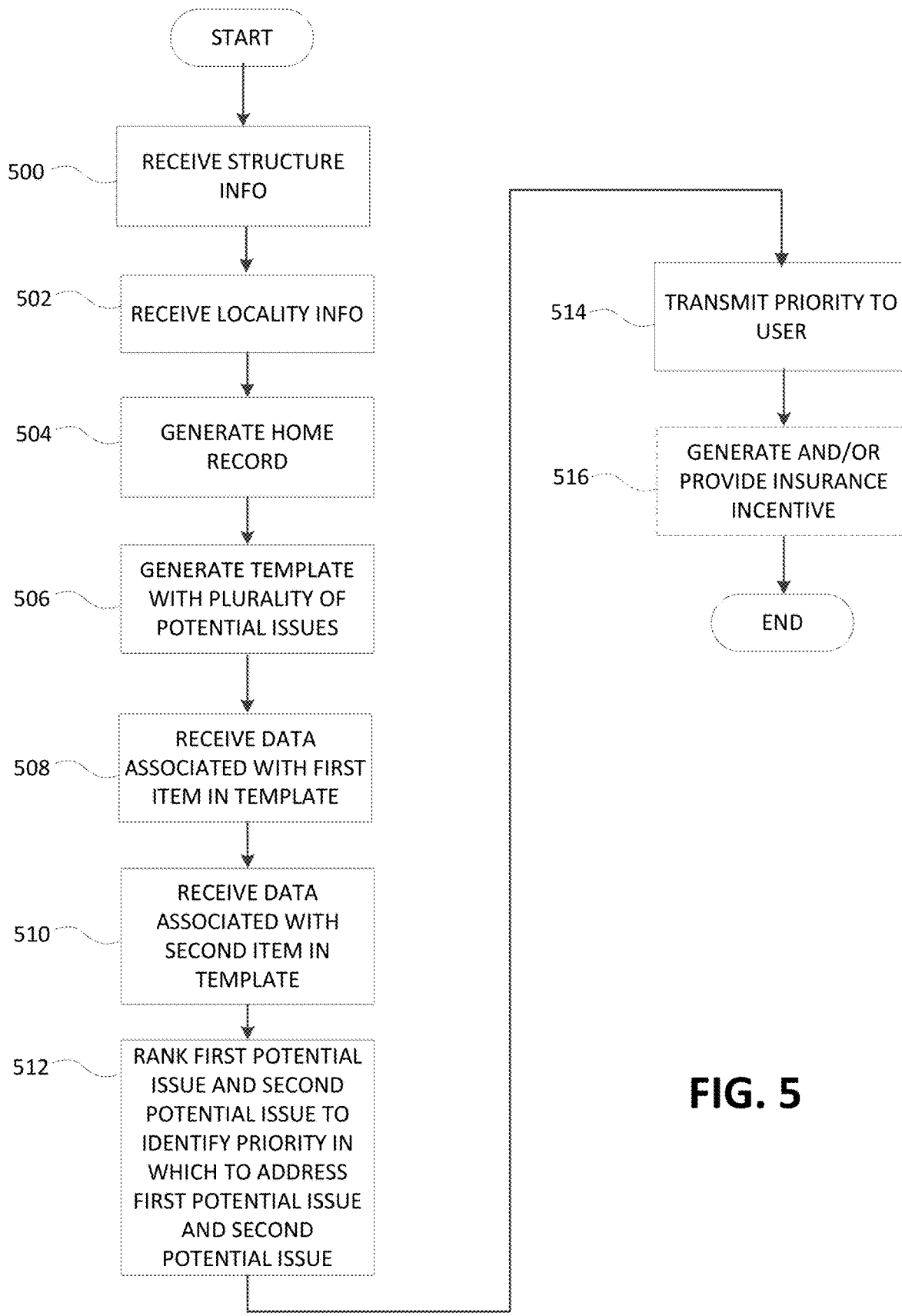
FIG. 5 is a flow chart illustrating another example method of evaluating a structure or portions of a structure according to one or more aspects described herein.

FIG. 5 illustrates another example method of conducting a home assessment according to one or more aspects described herein. In step 500, information associated with the home or structure is received. Similar to step 400 in FIG. 4, the home or structure information may include an age of the home, materials used in building the home, type of structure (e.g., single family residence, condominium, commercial structure, etc.), and the like. In some examples, the home or structure information may be received from a user (e.g., a homeowner) or from other sources, such as an insurance provider having information associated with the structure.

In step 502, locality information may be received. Similar to step 402, the locality information may include information such as cost of living, historical weather data, crime statistics, and the like. The locality information may include publicly available information and/or information held privately, such as by an insurance provider.

In step 504, a home record may be generated for the home or structure. Similar to arrangements discussed above, the home record may be generated based on the home or structure information, as well as the locality information. The home record may be used to track the structure, issues associated with the structure, repairs or improvements made to the structure, etc. In some examples, the home record may be updated with additional information, such as information provided by a user in subsequent steps.

In step 506, a home assessment template may be generated. Similar to arrangements discussed above, the home assessment template may include a listing of items for evaluation. The items being evaluated (e.g., items identified in the template) may be customized based on information known about the structure (e.g., from the received information, home record, etc.). Some example items for evaluation may include a roof, exterior structure, driveway condition, HVAC system, plumbing, electrical, appliances, and the like.

In step 508, data associated with a first item may be received. For instance, as discussed above, the template may be transmitted to a user who may be conducting an assessment of the home or structure. The template may be, in some examples, an online template accessed via a website (e.g., from a computing device of a user) or may be an application on a computing device of a user. Accordingly, the user may enter information directly into the template about the items being evaluated. For instance, a condition of one or more systems may be input by the user. The input may be selected from a pre-defined list of options (e.g., fair, good, excellent, etc.) and/or may be on a numeric scale (e.g., 1 to 10) indicating the condition of the item being evaluated.

In step 510, data or information associated with a second item in the template may be received. Similar to receiving information about the first item, the user or individual conducting the assessment may provide information about a second or additional system, item, feature, etc. of the home or structure. The information may include a description of the condition of the item, a numerical indication of the condition, selection of a condition from a list, and the like.

In some examples, receiving data associated with the first item and second item may include identifying and receiving additional information, as discussed above with respect to steps 412 and 414 in FIG. 4.

In step 512, the information received associated with the first item and the second item may be analyzed to determine whether an issue or potential issue exists and a priority for addressing the issues or potential issues may be determined. For instance, the data may be evaluated to determine whether an issue or a potential issue exists and/or whether repair or replacement is recommended. If an issue or potential issue is identified for multiple items being evaluated, the system may rank the identified issues or potential issues and may prioritize addressing the issues or identified issues. For instance, a severity of the issue may be considered, a likelihood of causing damage to other systems or items may be considered, age of the item may be considered, and the like. These factors may be considered and a priority of addressing the evaluated items may be determined.

In step 514, the priority may be transmitted to the user. If the information associated with the home assessment is being shared with an insurance provider (e.g., the insurance provider implementing the system), one or more insurance incentives may be generated in optional step 516. For instance, the system may generate and provide to the user an insurance incentive (such as a discount, rebate, rate adjustment, etc.) if the user addresses all issues or potential issues identified within a predetermined amount of time. In another example, an insurance incentive may be generated and provided to the user if the user addresses the identified issues according to the priority ranking of the system. Various other incentives may be generated without departing from the invention.

Although two items are evaluated in the method described in FIG. 5, three or more items may be evaluated and prioritized without departing from the invention.

Figure 6:
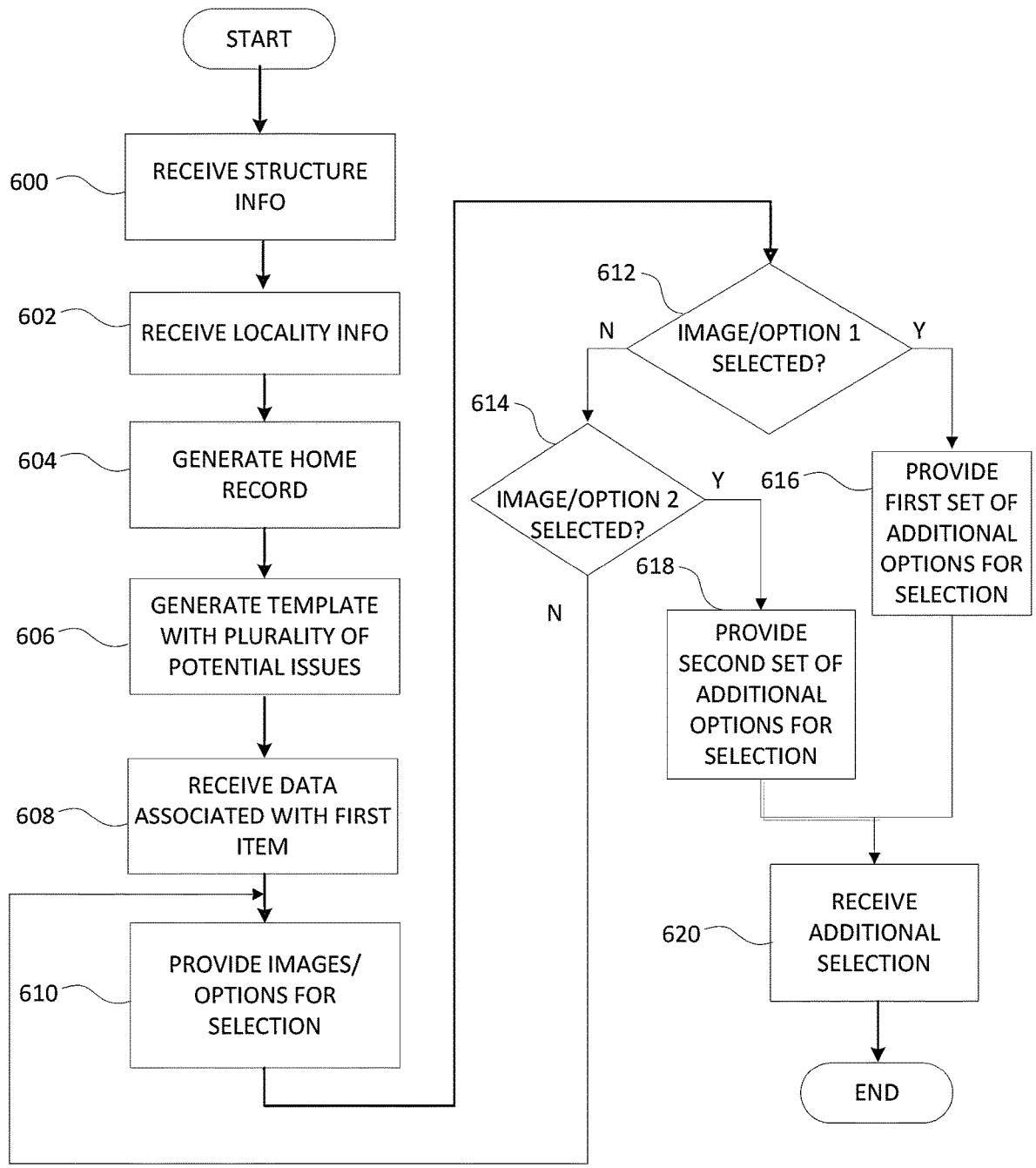
FIG. 6 is a flow chart illustrating yet another example method of evaluating a structure or portions of a structure according to one or more aspects described herein.

FIG. 6 illustrates yet another method of conducting a home assessment according to one or more aspects described herein. In step 600, information associated with the home or structure is received. Similar to step 400 in FIG. 4 and step 500 in FIG. 5, the home or structure information may include an age of the home, materials used in building the home, type of structure (e.g., single family residence, condominium, commercial structure, etc.), and the like. In some examples, the home or structure information may be received from a user (e.g., a homeowner) or from other sources, such as an insurance provider having information associated with the structure.

In step 602, locality information may be received. Similar to arrangements discussed above, the locality information may include information such as cost of living, historical weather data, crime statistics, and the like. The locality information may include publicly available information and/or information held privately, such as by an insurance provider.

In step 604, a home record may be generated for the home or structure. Similar to arrangements discussed above, the home record may be generated based on the home or structure information, as well as the locality information. The home record may be used to track the structure, issues associated with the structure, repairs or improvements made to the structure, etc. In some examples, the home record may be updated with additional information, such as information provided by a user in subsequent steps.

In step 606, a home assessment template may be generated. Similar to arrangements discussed above, the home assessment template may include a listing of items for evaluation. The items being evaluated (e.g., items identified in the template) may be customized based on information known about the structure (e.g., from the received information, home record, etc.). Some example items for evaluation may include a roof, exterior structure, driveway condition, HVAC system, plumbing, electrical, appliances, and the like.

In step 608, data associated with a first item may be received. For instance, as discussed above, the template may be transmitted to a user who may be conducting an assessment of the home or structure. The template may be, in some examples, an online template accessed via a website (e.g., from a computing device of a user) or may be an application on a computing device of a user. Accordingly, the user may enter information directly into the template about the items being evaluated. For instance, a condition of one or more systems may be input by the user. The input may be selected from a pre-defined list of options (e.g., fair, good, excellent, etc.) and/or may be on a numeric scale (e.g., 1 to 10) indicating the condition of the item being evaluated.

In step 610, images and/or options may be provided to the user to provide additional information about the first item. For instance, based on the received information associated with the first item, one or more images or options may be generated in order to obtain additional information associated with the first item. For instance, two or more images may be generated depicting examples of the first item in different states (e.g., new vs. in need of repair, one in need of repair and one in need of replacement, etc.). The images provided to the user may be based on the information received, as well as other information associated with the item, such as age of the item, type of item, etc. The images may be retrieved from one or more data stores containing various images.

In another example, instead of or in addition to providing images to the user, the system may generate different options for the user to select based on the received information. For instance, if a user indicates that the roof is in poor condition, the system may provide the user with options such as "is the roof peeling—yes or no" or "is the roof leaking—yes or no." These and various other options/images may be provided to the user in step 610.

In step 612, a determination is made as to whether a first image or option is selected. If so, a first set of additional options is provided for selection in step 616. In some examples, the first set of additional options may include additional images or sets of images for selection by the user. In other examples, the first set of additional options may include questions with various options for selection, as indicated above.

If, in step 612, the first image or option is not selected, a determination is made in step 614 as to whether the second image or option is selected. If not (e.g., if a user has selected a "neither" option or has cancelled the interaction), the process may return to step 610 and may provide images or options to the user. The images/options may be the same images or options or may be different images or options based on the user input received in steps 612 and/or 614.

If, in step 614, the second image or option is selected, a second set of additional options may be provided to the user in step 618. The second set of additional options may be different from the first set of additional options and may be based on the selection of the second image or option in step 614. Similar to step 616, the second set of additional options may include additional images or sets of images for selection by the user. In other examples, the second set of additional options may include questions with various options for selection, as indicated above.

In step 620, additional user input may be received. The additional user input may include selection of an option from the first set of additional options or the second set of additional options. The additional selection may then be used to evaluate the item being assessed to determine whether an issue or potential issue exists, as discussed above.

In some examples, upon receiving a user selection in step 620, further additional options may be provided for selection by the user. Additional selections may be provided until sufficient information is obtained to evaluate the item.

Similar to the methods described in FIGS. 4 and 5, one or more insurance incentives may be generated and provided to the user based on the selections made/received in FIG. 6.

Figure 7A:
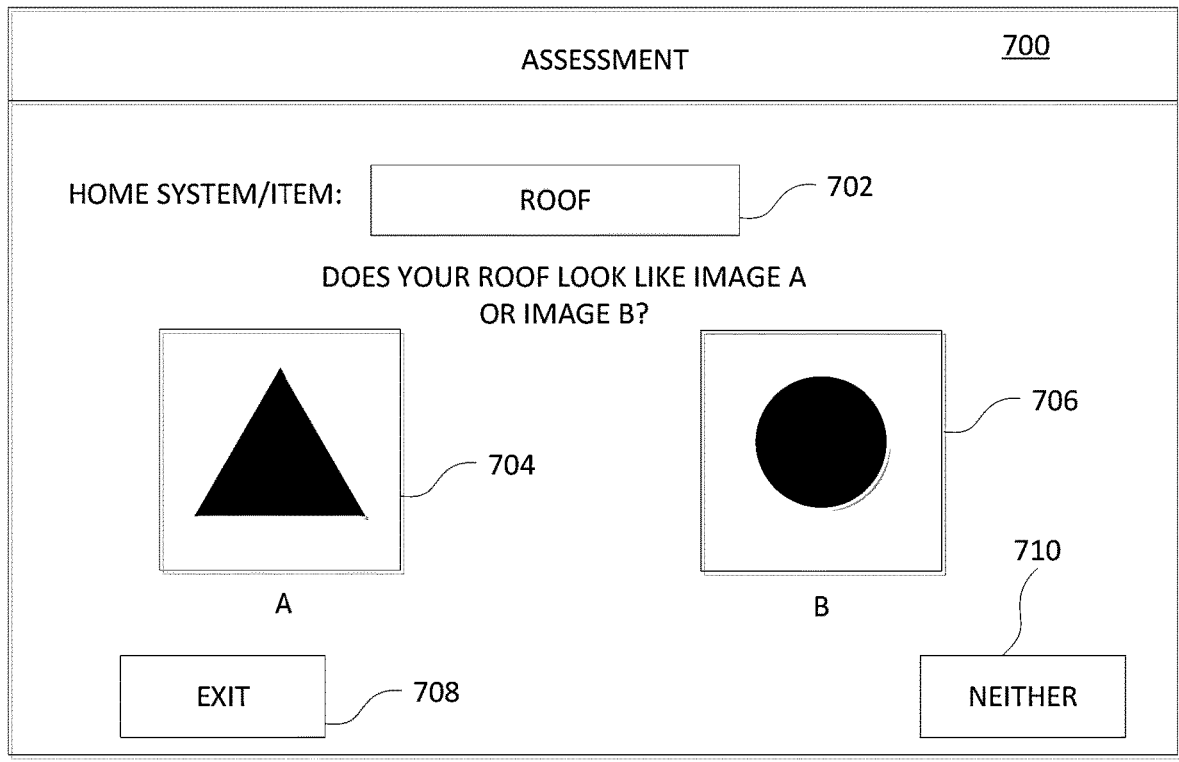
FIGS. 7A-7C illustrate example user interfaces that may be used with the home assessment system according to one or more aspects described herein.
Figure 7B:
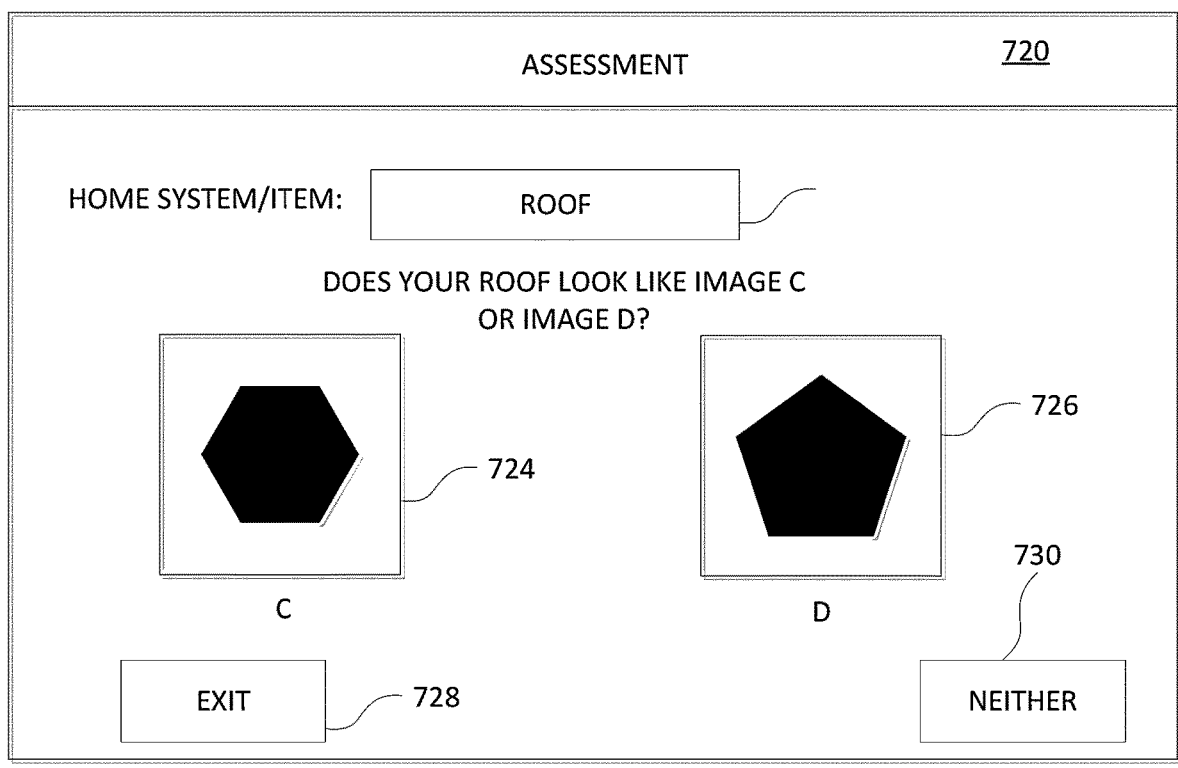
Figure 7C:
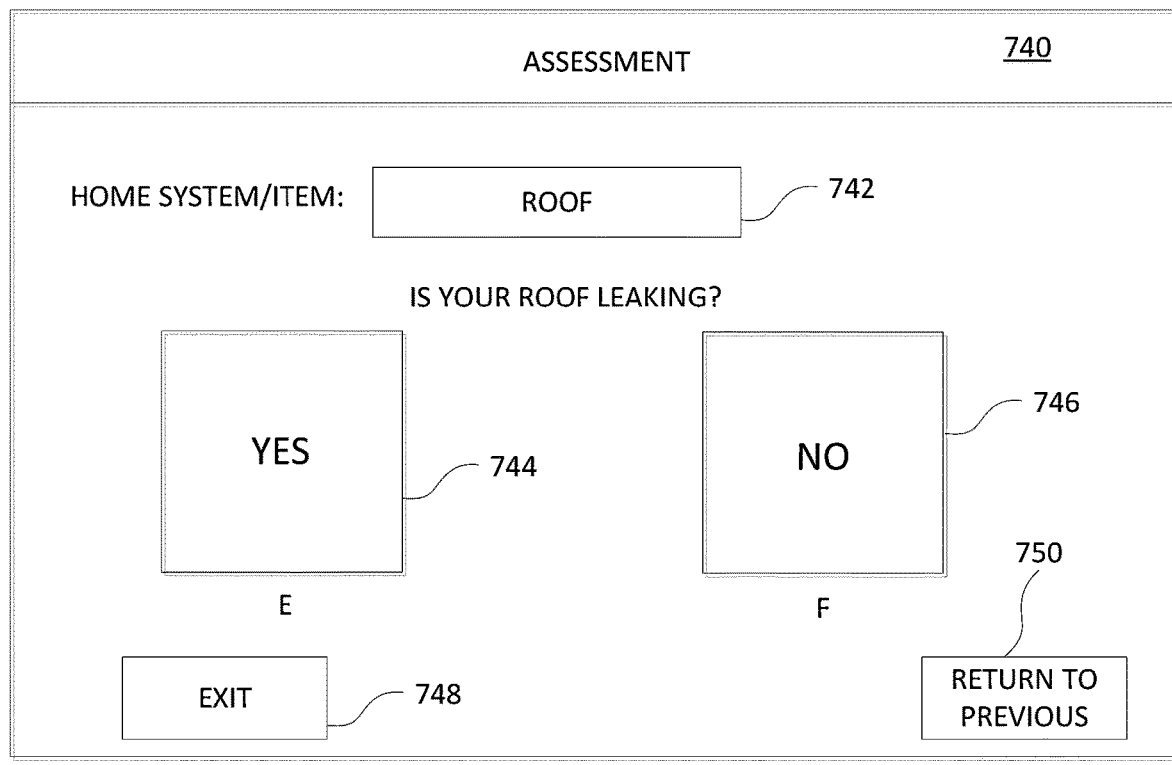

FIGS. 7A-7C illustrate example user interfaces that may be provided to the user for selection of various options associated with an item. FIG. 7A illustrates one example interface 700 in which an item is being evaluated or assessed. Field 702 identifies the item being evaluated. In the example shown in FIGS. 7A-7C, the roof of a structure is being evaluated.

The interface provides two options for selection, option A 704 and option B 706. The images shown for each option are merely schematic illustrations depicting different options. They are not intended to illustrate actual images presented to the user for selection.

Image A 704 and Image B 706 may illustrate a roof or portion of a roof in different states (e.g., new vs. in need of repair, in need of repair vs. in need of replacement, etc.). The user may select the option that is most similar to the roof of the structure being evaluated. Upon selection of either Image A 704 or Image B 706, another interface may be displayed. Alternatively, the user may indicate that neither image is similar to the item being evaluated by selecting "NEITHER" option 710. The user may also exit the system by selecting "EXIT" option 708.

As indicated above, selection of either Image A 704 or Image B 706 may prompt display of another user interface. For instance, if Image A 704 is selected, user interface 720 as shown in FIG. 7B may be displayed. The user interface displays two additional images, Image C 724 and Image D 726. Once again, the images are merely schematic examples intended to illustrate that two different images may be provided for selection. The images displayed (e.g., Image C 724 and Image D 726) are identified and provided to the user based on selection of the image in the previous interface 700. Accordingly, selection of Image B 706 from interface 700 would result in different options or images being provided for selection in a subsequent interface.

If neither Image C 724 nor Image D 726 is similar to the item being evaluated, the user may select "NEITHER" option 730. In some examples, selection of this option may return the user to the previous interface. Alternatively, the user may select "EXIT" option 728 to exit the system.

Selection of either Image C 724 or Image D 726 may prompt display of one or more additional user interfaces with additional options for selection or may provide sufficient information for the system to evaluate the item.

If, from interface 700, the user selects Image B 706, another interface may be displayed, such as interface 740 in FIG. 7C. The interface 740 provides additional options for selection. In the arrangement shown in FIG. 7C, additional images are not provided. Instead, a request for information is provided with two options for answers. The user may select "YES" option 744 or "NO" option 746. These are merely example options that may be provided to the user. Various other options may be provided without departing from the invention.

Again, the display of options 744 and 746 in interface 740 is based on the selection of Image B 706 from interface 700. Accordingly, selection of one image or option prompts display of additional information or options, until sufficient information is received to evaluate the item.

Provided below are various example arrangements of the home assessments and home assessment systems described herein. The arrangements described below are merely some examples of systems and implementations, and nothing in the examples should be construed as limiting the invention to only those examples. Rather, various other systems and implementations may be used without departing from the invention.

In one example, a user may which to conduct an assessment on his or her home. The user may access the system to generate a home record for the structure and/or a template of items for evaluation. The template may be based on data associated with the structure that is publicly available, received from an insurance provider (e.g., the insurance provider insuring the home) and/or the user. In some examples, the user may further customize the template to include additional items, specific features of characteristics of particular items, etc.

The template may be accessible to the user via the user's mobile device. Accordingly, the user may move around the home to assess each item identified in the template. The user may provide general and/or specific information about each item. In some arrangements, the template may prompt the user to answer particular questions about an item. Additional questions may then be provided to the user based on the answers given to previous questions. In some examples, the template may provide two or more images to a user. The user may select the image that has an appearance most similar to the item being evaluated in the home. Additional options, questions or images may then be presented to the user based on the image selected.

Once the user has provided information about the items in the home, any issues or potential issues may be identified by the system. The system may then rank the issues or potential issues identified in order to provide a priority in which the issues or potential issues should be addressed.

In some arrangements, the system may transmit the data associated with the items to a contractor or other home improvement center in order to provide a cost estimate to the user. In some examples, the data may be transmitted to or accessed by the insurance provider who may identify one or more insurance incentives to encourage the user to address one or more of the issues or potential issues identified.\

In another example, a user may wish to conduct a home assessment and may wish to have expert assistance in doing so. Accordingly, the user may conduct the assessment similar to the arrangement discussed above but may transmit all data collected to a third party expert for evaluation and further analysis. In some examples, the user may capture video and/or photographic images of one or more items to assist in the evaluation.

In yet another example, a user may wish to conduct an assessment and may wish to have a third party contractor or other expert assist during the data collection portion of the assessment. Accordingly, once the template is generated, a user may provide video and/or photographic images to the expert in real-time or near real-time (e.g., as the user is gathering the data) in order to ensure that the user is accurately responding to requests for information provided in the template. For instance, the user may stream video of a roof to the expert in order to obtain the expert's opinion of the condition of the roof in answering the requests for information found in the template. In some examples, the third party expert may also receive the template in order to ensure that accurate information is provided to the system.

The arrangements discussed herein aid users in evaluating various systems or items associated with a home or structure in order to ensure issues or potential issues are identified as early as possible and that repairs or replacements are made in a timely manner in order to avoid further damage to the item or structure. Further, the system may permit the user to enlist the assistance of experts without requiring the expert to be present at the structure or conduct the assessment personally.

Although various aspects described herein are described in the context of a home, the systems and arrangements described herein may be used with any type of structure, including business structures (e.g., shops, restaurants, etc.), garages, warehouses, and the like.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A system, comprising:
  a computer having a memory and a processor, the computer configured to implement a modular home assessment by executing an application on the computer, to:
    generate a profile of a structure based at least in part on first data, from a first database, comprising one or more characteristics of the structure and based at least in part on second data, from a second database, comprising location information of the structure;
    generate, based at least in part on the first data and the second data, a computer-implemented template of items associated with the structure to be evaluated, wherein the computer-implemented template of items is associated with the profile of the structure;
    receive user-entered data via the computer-implemented template and receive video or image data associated with at least one item included in the computer-implemented template;
    transmit user-entered data and video or image data to an assessment reviewer;
    receive first additional information associated with the at least one item identified in the computer-implemented template based at least in part on a request for first additional information associated with the at least one item to be used for further analysis, the first additional information associated with the at least one item being identified based on the first data, second data and information associated with the at least one item and the first additional information including a selection of a first image from a first screen including a plurality of images available for selection;
    transmit a request to select a second image from a second screen including a second plurality of images available for selection based at least in part on a request for further additional information associated with the at least one item, the further additional information associated with the at least one item being identified based on the selection of the first image;
    receive the further additional information associated with the at least one item identified in the computer-implemented template, the further additional information including a selection of the second image from the second screen;

determine whether an issue or potential issue exists based at least in part on analysis of the further additional information associated with the at least one item identified in the computer-implemented template; and provide options to a user associated with the structure for addressing the issue or potential issue.

2. The system of claim 1, wherein receiving the video or image data associated with the at least one item identified in the computer-implemented template includes receiving the video or image data from a mobile computing device of the user.

3. The system of claim 1, wherein the computer is further configured to:

transmit an indication of an existing issue or potential issue to a contractor requesting an estimate of cost to address the existing issue or potential issue.

4. The system of claim 1, wherein the profile of the structure is contained in a structure record and wherein the computer is further configured to:

update the structure record to include the video or image data associated with the at least one item and the first additional information associated with the at least one item or the further additional information associated with the at least one item, or both.

5. The system of claim 1, wherein the first data associated with the structure includes data from an insurance provider and associated with the structure.

6. The system of claim 1, wherein the second data includes publicly available information associated with a location in which the structure is located.

7. The system of claim 1, wherein the computer is further configured to:

provide an insurance incentive to the user conditional upon the user taking action to address an existing issue or potential issue.

8. A method for modular home assessment, comprising:

generating a profile of a structure based at least in part on first data, from a first database, comprising one or more characteristics of the structure and based at least in part on second data, from a second database, comprising location information of the structure;

generating, based at least in part on the first data and the second data, a computer-implemented template of items associated with the structure to be evaluated, wherein the computer-implemented template of items is associated with the profile of the structure;

receiving user-entered data via the computer-implemented template and receive video or image data associated with at least one item included in the computer-implemented template;

transmitting user-entered data and video or image data to an assessment reviewer;

receiving first additional information associated with the at least one item identified in the computer-implemented template based at least in part on a request for first additional information associated with the at least one item to be used for further analysis, the first additional information associated with the at least one item being identified based on the first data, second data and information associated with the at least one item and the first additional information including a selection of a first image from a first screen including a plurality of images available for selection;

transmitting a request to select a second image from a second screen including a second plurality of images available for selection based at least in part on a request for further additional information associated with the at least one item, the further additional information associated with the at least one item being identified based on the selection of the first image;

receiving the further additional information associated with the at least one item identified in the computer-implemented template, the further additional information including a selection of the second image from the second screen;

determining whether an issue or potential issue exists based at least in part on analysis of the further additional information associated with the at least one item identified in the computer-implemented template; and providing options to a user associated with the structure for addressing the issue or potential issue.

9. The method of claim 8, wherein receiving the video or image data associated with the at least one item identified in the computer-implemented template includes receiving the video or image data from a mobile computing device of the user.

10. The method of claim 8, further comprising:

transmitting an indication of an existing issue or potential issue to a contractor requesting an estimate of cost to address the existing issue or potential issue.

11. The method of claim 8, wherein the profile of the structure is contained in a structure record, the method further comprising:

updating the structure record to include the video or image data associated with the at least one item and the first additional information associated with the at least one item or the further additional information associated with the at least one item, or both.

12. The method of claim 8, wherein the first data associated with the structure includes data from an insurance provider and associated with the structure.

13. The method of claim 8, wherein the second data includes publicly available information associated with a location in which the structure is located.

14. The method of claim 8, further comprising:

providing an insurance incentive to the user conditional upon the user taking action to address an existing issue or potential issue.

15. An apparatus, comprising:

at least one processor; and a memory storing computer-readable instructions that, when executed by the at least one processor, cause the apparatus to:

generate a profile of a structure based at least in part on first data, from a first database, comprising one or more characteristics of the structure and based at least in part on second data, from a second database, comprising location information of the structure;

generate, based at least in part on the first data and the second data, a computer-implemented template of items associated with the structure to be evaluated, wherein the computer-implemented template of items is associated with the profile of the structure;

receive user-entered data via the computer-implemented template and receive video or image data associated with at least one item included in the computer-implemented template;

transmit user-entered data and video or image data to an assessment reviewer;

receive first additional information associated with the at least one item identified in the computer-implemented template based at least in part on a request for first additional information associated with the at least one item to be used for further analysis, the first additional information associated with the at least one item being identified based on the first data, second data and information associated with the at least one item and the first additional information including a selection of a first image from a first screen including a plurality of images available for selection;

transmit a request to select a second image from a second screen including a second plurality of images available for selection based at least in part on a request for further additional information associated with the at least one item, the further additional information associated with the at least one item being identified based on the selection of the first image;

receive the further additional information associated with the at least one item identified in the computer-implemented template, the further additional information including a selection of the second image from the second screen;

determine whether an issue or potential issue exists based at least in part on analysis of the further additional information associated with the at least one item identified in the computer-implemented template; and provide options to a user associated with the structure for addressing the issue or potential issue.

16. The apparatus of claim 15, wherein receiving the video or image data associated with the at least one item identified in the computer-implemented template includes receiving the video or image data from a mobile computing device of the user.

17. The apparatus of claim 15, wherein the memory storing computer-readable instructions is further executable by the at least one processor to cause the apparatus to:
transmit an indication of an existing issue or potential issue to a contractor requesting an estimate of cost to address the existing issue or potential issue.

18. The apparatus of claim 15, wherein the profile of the structure is contained in a structure record and wherein the memory storing computer-readable instructions is further executable by the at least one processor to cause the apparatus to:
update the structure record to include the video or image data associated with the at least one item and the first additional information associated with the at least one item or the further additional information associated with the at least one item, or both.

19. The apparatus of claim 15, wherein the first data associated with the structure includes data from an insurance provider and associated with the structure.

20. The apparatus of claim 15, wherein the memory storing computer-readable instructions is further executable by the at least one processor to cause the apparatus to:
provide an insurance incentive to the user conditional upon the user taking action to address an existing issue or potential issue.

* * * * *